United States Patent
Huang

(10) Patent No.: US 6,530,591 B2
(45) Date of Patent: Mar. 11, 2003

(54) DOUBLE-SEAT FRAME STRUCTURE FOR BABY STROLLER

(76) Inventor: Mien Chen Huang, 123-2, Pitou Kuanmiao, Tainan (TW)

( * ) Notice: Subject to any disclaimer, the term of this patent is extended or adjusted under 35 U.S.C. 154(b) by 0 days.

(21) Appl. No.: 09/924,747

(22) Filed: Aug. 7, 2001

(65) Prior Publication Data

US 2003/0030252 A1 Feb. 13, 2003

(51) Int. Cl.⁷ .................................................. B62B 1/00
(52) U.S. Cl. ...................... 280/650; 280/642; 280/658; 280/47.38
(58) Field of Search ................................ 280/650, 642, 280/643, 647, 648, 649, 657, 658, 47.4, 47.38, 87.043, 35, 638, 639, 47.39

(56) References Cited

U.S. PATENT DOCUMENTS

| | | | | |
|---|---|---|---|---|
| 3,084,949 A | * | 4/1963 | Forster et al. | 280/650 |
| 4,725,071 A | * | 2/1988 | Shamie | 280/643 |
| 4,741,551 A | * | 5/1988 | Perego | 280/642 |
| D356,528 S | * | 3/1995 | Liu | D12/129 |
| 5,622,375 A | * | 4/1997 | Fairclough | 280/642 |
| 5,664,795 A | * | 9/1997 | Haung | 280/47.38 |
| 5,725,238 A | * | 3/1998 | Huang | 280/642 |
| 6,062,589 A | * | 5/2000 | Cheng | 280/647 |
| 6,086,087 A | * | 7/2000 | Yang | 280/658 |
| 6,135,487 A | * | 10/2000 | Flannery et al. | 280/642 |
| 6,152,476 A | * | 11/2000 | Huang | 280/642 |
| 6,273,451 B1 | * | 8/2001 | Julien et al. | 280/642 |
| 6,447,001 B1 | * | 9/2002 | Hsia | 280/642 |

* cited by examiner

Primary Examiner—Brian L. Johnson
Assistant Examiner—Hau Phan
(74) Attorney, Agent, or Firm—Pro-Techtor International Services

(57) ABSTRACT

A frame structure for baby stroller is constructed to include a rear seat frame bar adapted to support a rear seat, a front seat frame adapted to support a front seat, the front seat frame having a curved middle section extended downwards and then backwards below the elevation of the rear seat frame bar and supporting a footplate for the standing of a child behind the rear seat frame bar, and a backrest frame bar pivoted to the front seat frame bar and locked in one of a series of tilted positions.

4 Claims, 4 Drawing Sheets

US 6,530,591 B2

DOUBLE-SEAT FRAME STRUCTURE FOR BABY STROLLER

BACKGROUND OF THE INVENTION

The present invention relates to a baby stroller, and more specifically, to a strong frame structure for baby stroller, which is equipped with a footplate at the rear side for the standing of a child.

Baby strollers with a footplate at the rear side for the standing of a child are known. These baby strollers include two types, one with a detachable footplate, and the other with a fixed footplate. Because a detachable footplate requires a complicated coupling structure for installation, it is expensive to manufacture and inconvenient to use. FIG. 1 shows a baby stroller with a fixed footplate. According to this design, two extension bars 30 are respectively extended from the rear wheels 20 and respectively pivoted to the bottom end of each of the rear wheel frame bars 40 to support a fixed footplate 10, and two spring members 50 are respectively connected between the rear end of each of the extension bars 30 and the rear wheel frame bars 40. This design is not safe in use. Because the center of gravity is at a location in front of the rear wheels 20 but not adjacent to the axis connected between the rear wheels 20 when a child stands up on the foot plate 10, the spring members 50 tend to be forced out of the rear wheel frame bars 40 or the extension bars 30 during movement of the baby stroller over an uneven road surface.

SUMMARY OF THE INVENTION

The present invention has been accomplished to provide a frame structure for baby stroller, which eliminates the aforesaid drawbacks. It is one object of the present invention to provide a frame structure for baby stroller, which is equipped with a footplate for the standing of a child at the rear side. It is another object of the present invention to provide a frame structure for baby stroller with a rear footplate, which is strong and simple. To achieve these and other objects of the present invention, the frame structure for baby stroller comprises a substantially U-shaped handlebar having two distal ends, two front wheel frame bars, the front wheel frame bars each having a bottom end equipped with a front wheel and a top end pivoted to one end of said handlebar, two rear wheel frame bars, the rear wheel frame bars each having a bottom end equipped with a rear wheel and a top end pivoted to one end of the handlebar adjacent to the top end of one front wheel frame bar, a front seat frame bar adapted to support a front seat, a rear seat frame bar fixedly fastened to the front seat frame bar and adapted to support a rear seat, a substantially U-shaped backrest frame bar pivoted to two opposite lateral sides of the front seat frame bar. The front seat frame has a curved middle section extended downwards and then backwards below the elevation of the rear seat frame bar and supporting a footplate for the standing of a child behind the rear seat frame bar. Further, the backrest frame bar is pivoted to the front seat frame bar and locked in one of a series of tilted positions.

DETAILED DESCRIPTION OF THE PREFERRED EMBODIMENT

Figure 1:
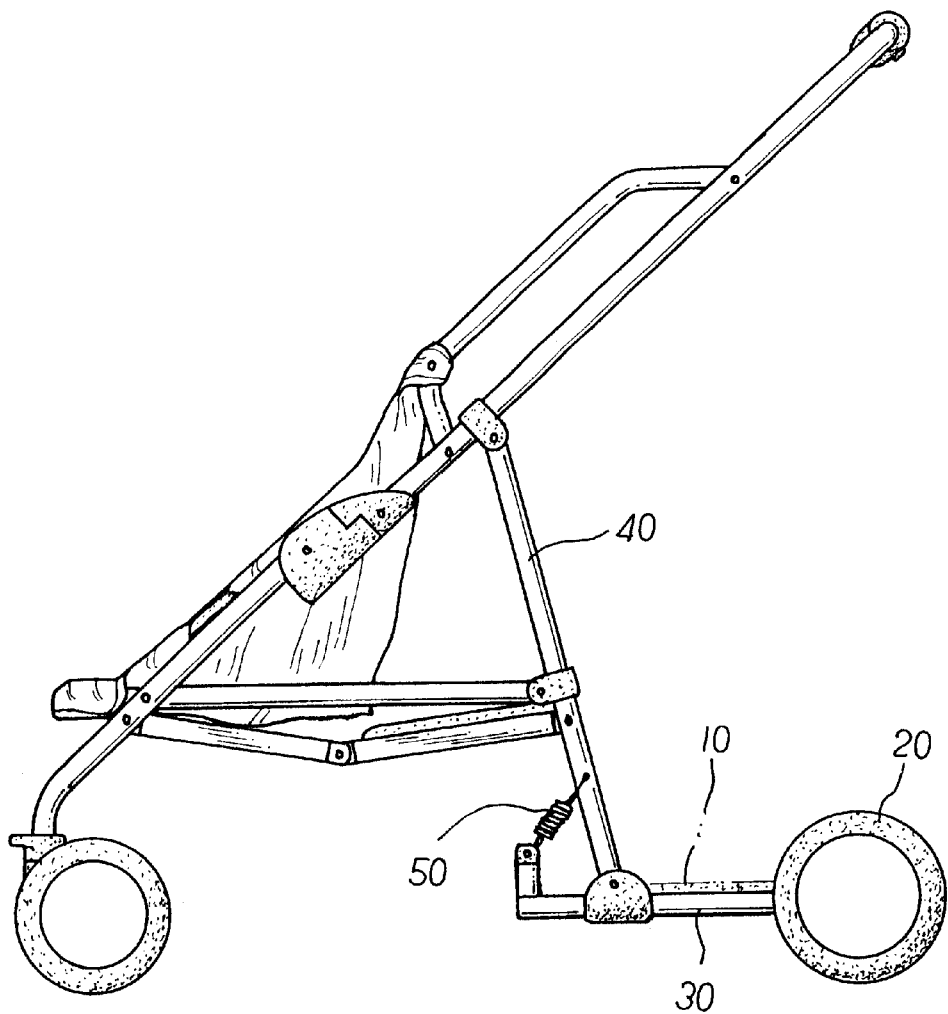
FIG. 1 is an elevational view of a baby stroller with footplate constructed according to the prior art.
Figure 2:
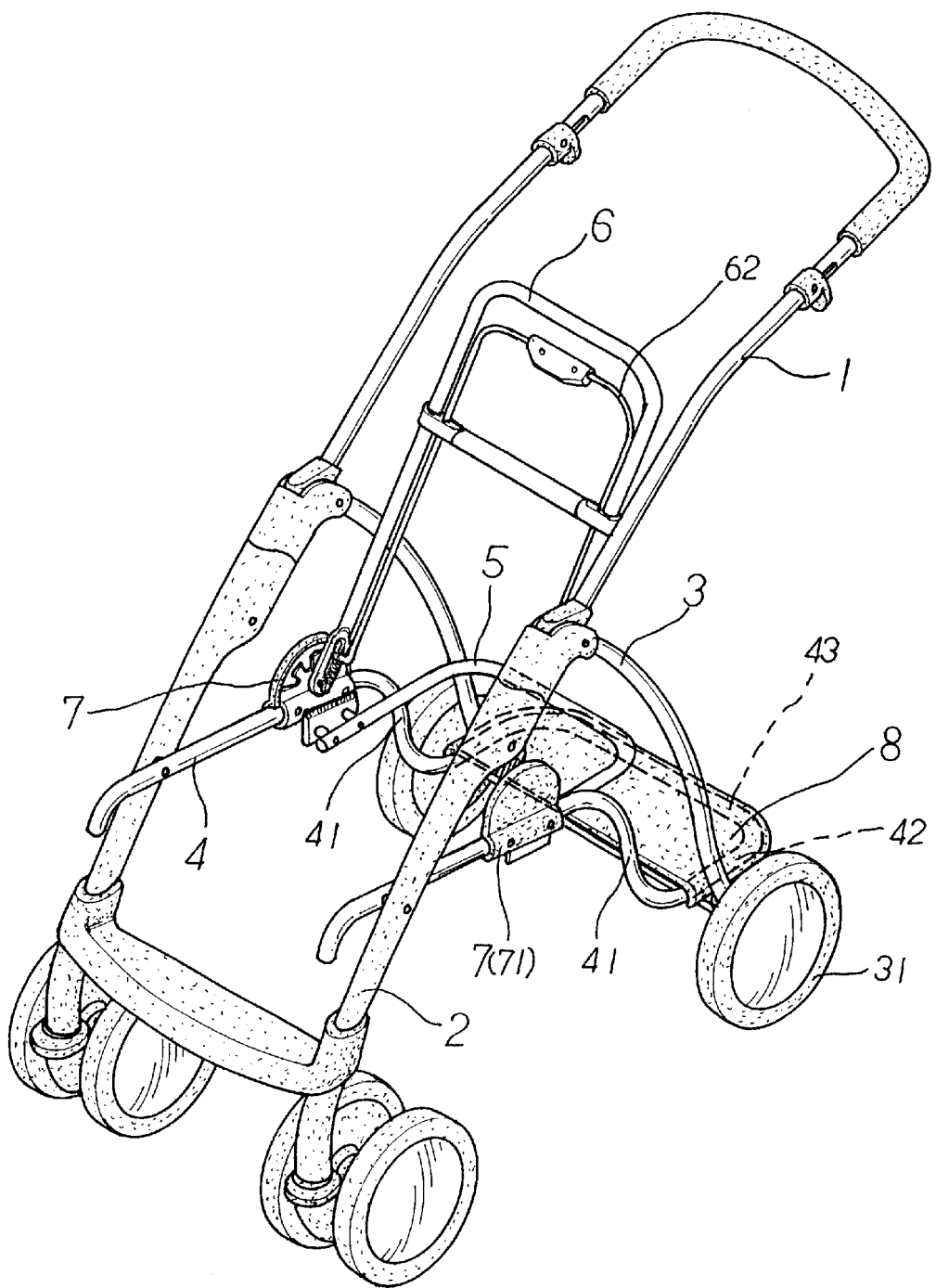
FIG. 2 is a perspective view of a frame structure for baby stroller constructed according to the present invention.

Referring to FIG. 2, a double-seat frame structure for baby stroller in accordance with the present invention is generally comprised of a handlebar 1, two front wheel frame bars 2, two rear wheel frame bars 3, a front seat frame bar 4, a rear seat frame bar 5, a backrest frame bar 6, a locking wire rod 62, two backrest frame bar positioning devices 7, and a footplate 8. The handlebar 1 a substantially U-shaped bar having two distal ends respectively pivoted to the top end of each of the rear wheel frame bars 3 and then pivoted to the top end of each of the front wheel frame bars 2. The front wheel frame bars 2 each have the respective bottom end coupled with a respective front wheel 21. The rear wheel frame bars 3 each have the respective bottom end coupled with a respective rear wheel 31. The front sear frame bar 4 and the rear seat frame bar 5 are horizontally connected together. The two positioning devices 7 are respectively fixedly fastened to two opposite lateral sides of the front seat frame bar 4. The backrest frame bar 6 is a substantially U-shaped frame bar having two distal ends respectively pivoted to the positioning members 7. The front seat frame bar 4 is a substantially U-shaped frame bar having a curved middle section extended downwards and then backwards below the elevation of the rear seat frame bar 5. The curved middle section of the U-shaped frame bar of the front seat frame bar 4 comprises a transverse frame bar portion 43, two vertical frame bar portions 41, and two horizontal frame bar portions 42 respectively connected between two ends of the transverse frame bar portion 43 and the bottom end of each of the vertical frame bar portions 41. The horizontal frame bar portions 42 of the front seat frame bar 4 are respectively pivoted to the rear wheel frame bars 3 adjacent to the respective rear wheels 31. The footplate 8 is mounted on the horizontal frame bar portions 42 and transverse frame bar portion 43 of the front seat frame bar 4.

Figure 3:
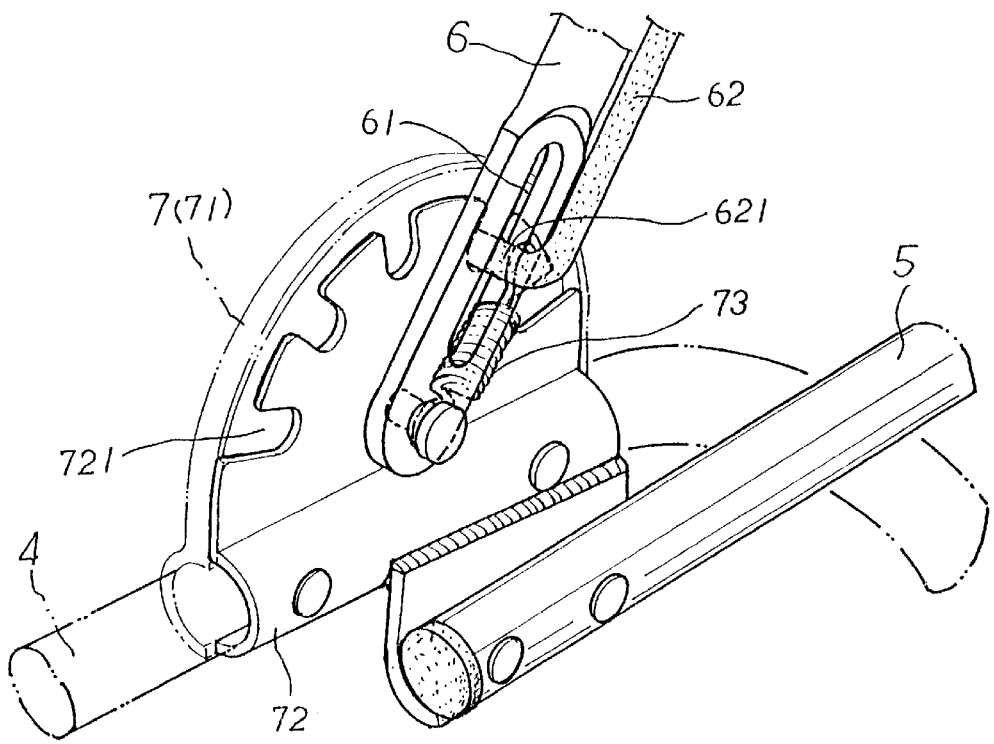
FIG. 3 is a perspective view in an enlarged scale of a part of the present invention, showing the arrangement of the backrest frame bar positioning device, the backrest frame bar, and the locking wire rod.
Figure 4:
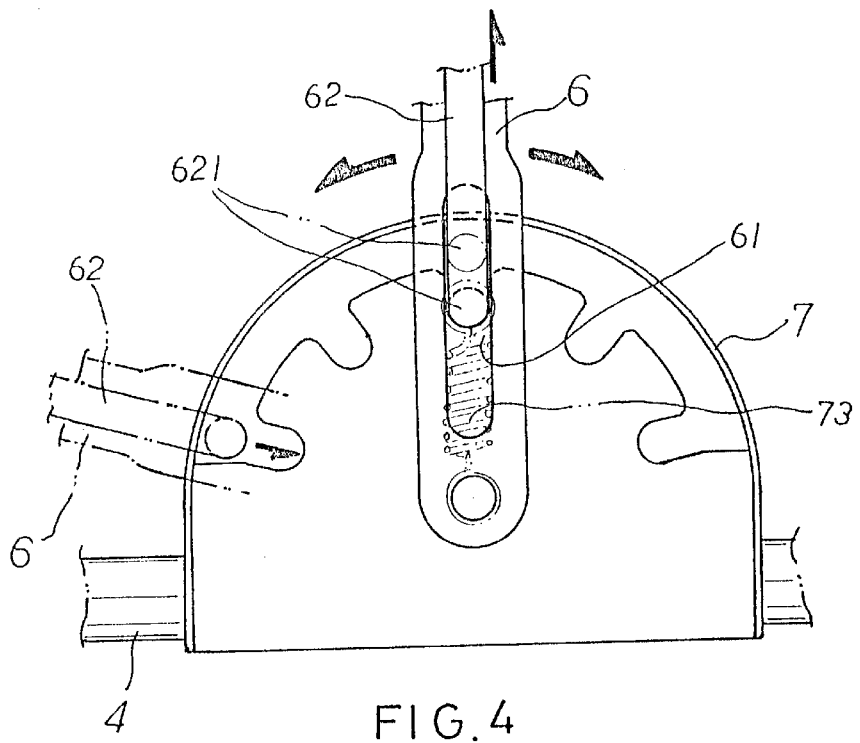
FIG. 4 is a plain view in an enlarged scale of a part of the present invention, showing the adjustment of the tilt angle of the backrest frame bar.

Referring to FIGS. 3 and 4 and FIG. 2 again, the backrest frame bar positioning devices 7 each comprise a base frame plate 71, an engagement frame plate 72, and a spring 73. The base frame plate 71 and the engagement frame plate 72 are attached together and fixedly fastened to the front seat frame bar 4 at one side. The engagement frame plate 72 has a plurality of peripheral engagement notches 721 equally spaced around the pivoted point between the engagement frame plate 72 and one end of the backrest frame bar 6. The backrest frame bar 6 has a longitudinal sliding slot 61 in each of the two ends thereof. The locking wire rod 62 has two angled engagement ends 621 respectively inserted through the longitudinal sliding slot 61 in each of the two ends of the backrest frame bar 6 and engaged into one peripheral engagement notch 721 of the engagement frame plate 72 of each of the backrest frame bar positioning devices 7. The springs 73 are respectively connected between the backrest frame bar positioning devices 7 and the angled engagement ends 621 of the locking wire rod 62 to pull the angled engagement ends 621 of the locking wire rod 62 into engagement with one peripheral engagement notch 721 of the engagement frame plate 72 of each of the backrest frame bar positioning devices 7. When pulling the locking wire rod 62 upwards to disengage the angled engagement ends 621 from the peripheral engagement notches 721 of the engagement frame plate 72 of each of the backrest frame bar positioning devices 7, the backrest frame bar 6 is unlocked, and therefore the user can turn the backrest frame bar 6 relative to the backrest frame bar positioning devices 7 to adjust the tilt angle of the backrest frame bar 6 relative to the front seat frame bar 4 and the rear seat frame bar 5. When released from the hand, the springs 73 immediately pull the angled engagement ends 621 of the locking wire rod 62 into engagement with the peripheral engagement notches 721 of the backrest frame bar positioning devices 7 to lock the backrest frame bar 6 in the selected tilt position.

Figure 5:
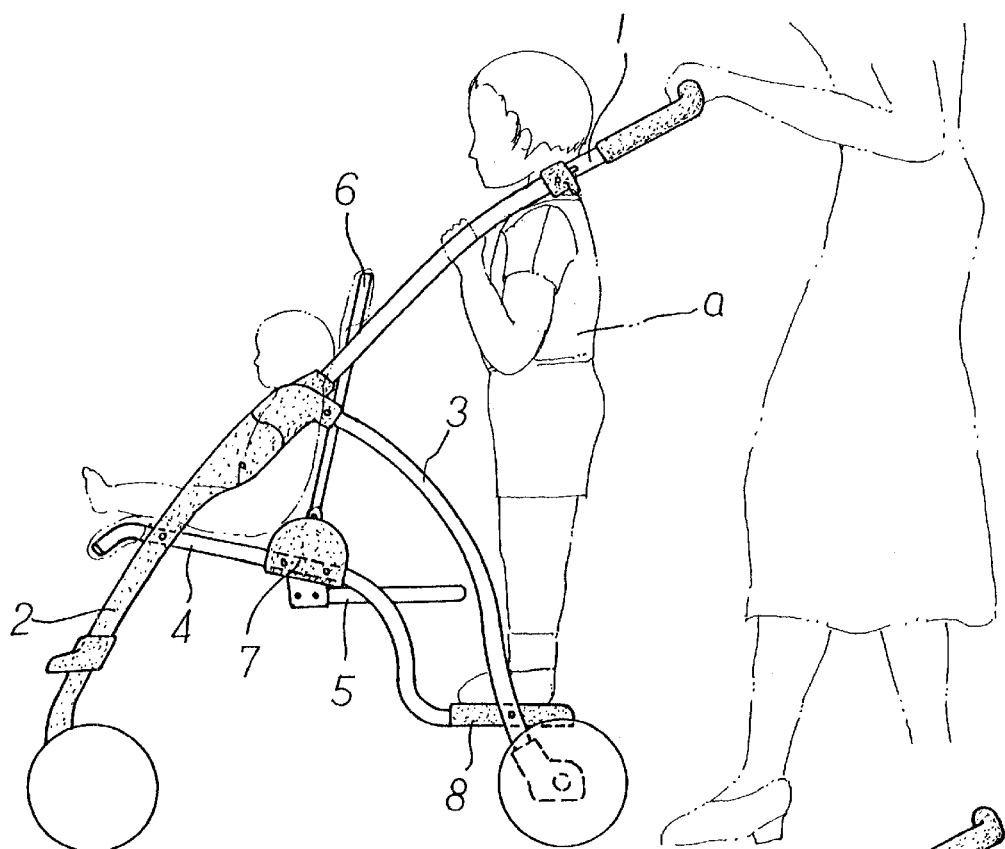
FIG. 5 shows an application example of the present invention.
Figure 6:
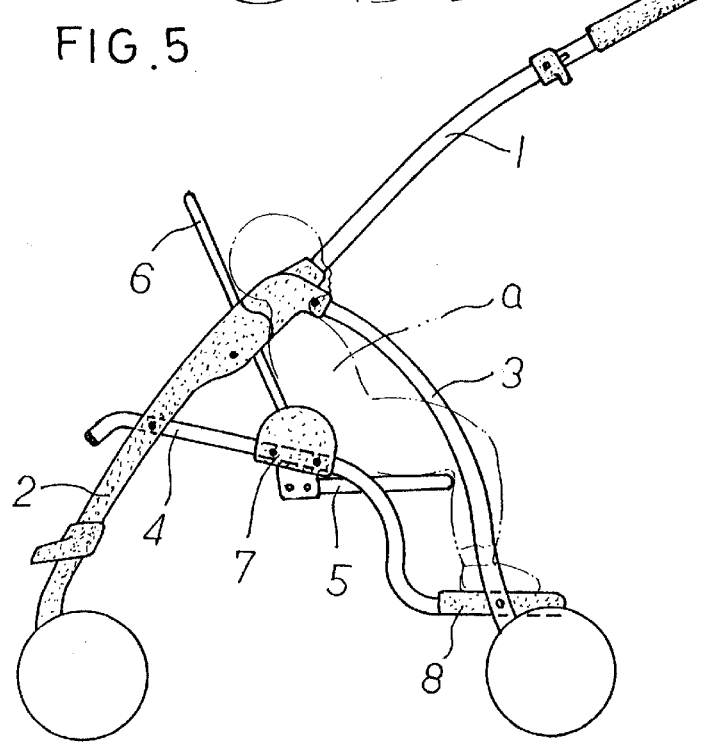
FIG. 6 shows another application example of the present invention.

FIGS. 5 and 6 show two different application examples of the present invention. FIG. 5 shows the backrest frame bar 6 tilted backwards, a baby sit on the seat at the front seat frame bar 4, and a child a stood up on the footplate 8. FIG. 6 shows the backrest frame bar 6 tilted forwards, a child a sitting on the seat at the rear seat frame bar 5.

As indicated above, the front seat frame bar 4 has a curved middle section extended downwards and then forwards to support the footplate 8 behind the rear seat frame bar 5 at a lower elevation than the rear seat frame bar 5. When a child standing up on the footplate 8, the center of gravity of the child is not far from the rear wheels 31, therefore the baby stroller is strong enough to support the load. Further, the design of the engagement devices 7 and the locking wire rod 62 enables the tilt angle of the backrest frame bar 6 to be adjusted to fit different service modes.

While only one embodiment of the present invention has been shown and described, it will be understood that the drawings are designed for purposes of illustration only, and are not intended for use as a definition of the limits and scope of the invention disclosed.

What the invention claimed is:

1. A frame structure for baby stroller comprising a substantially U-shaped handlebar having two distal ends, two front wheel frame bars, said front wheel frame bars each having a bottom end equipped with a front wheel and a top end pivoted to one end of said handlebar, two rear wheel frame bars, said rear wheel frame bars each having a bottom end equipped with a rear wheel and a top end pivoted to one end of said handlebar adjacent to the top end of one front wheel frame bar, a front seat frame bar adapted to support a front seat, a rear seat frame bar fixedly fastened to said front seat frame bar and adapted to support a rear seat, and a substantially U-shaped backrest frame bar pivoted to two opposite lateral sides of said front seat frame bar, wherein said front sear frame bar is a substantially U-shaped frame bar has a curved middle section extended downwards and then backwards below the elevation of said rear seat frame bar and supporting a footplate for the standing of a child behind said rear seat frame bar, said curved middle section comprising a transverse frame bar portion, two vertical frame bar portions, and two horizontal frame bar portions respectively connected between two ends of said transverse frame bar portion and a bottom end of each of said vertical frame bar portions and respectively pivoted to said rear wheel frame bars adjacent to the respective rear wheels at said rear wheel frame bars.

2. The frame structure for baby stroller as claimed in claim 1 further comprising two backrest frame bar positioning devices respectively fixedly fastened to said front seat frame bar at two opposite lateral sides and adapted to hold said backrest frame bar in one of a series of tilted positions, and locking means adapted to lock said backrest frame bar in one of said series of tilted positions.

3. The frame structure for baby stroller as claimed in claim 2 wherein said backrest frame bar has two distal ends respectively pivoted to said backrest frame bar positioning devices at said front seat frame bar and two longitudinal sliding slots respectively disposed near the two distal ends and adapted to receive said locking means; said backrest frame bar positioning devices each comprise a plurality of peripheral engagement notches for engagement with said locking means to lock said backrest frame bar in one of said series of tilted positions; said lock means comprises a substantially U-shaped locking wire rod, said locking wire rod having two angled engagement ends respectively inserted through the longitudinal sliding slots of said backrest frame bar and engaged into the peripheral engagement notches of said backrest frame bar positioning devices to lock the backrest frame bar in one of said series of tilted positions, and spring means connected between the angled engagement ends of said locking wire rod and said backrest frame bar positioning devices and adapted to pull the angled engagement ends of said locking wire rod into one peripheral engagement notch of each of said backrest frame bar positioning devices.

4. The frame structure for baby stroller as claimed in claim 1 wherein said footplate is fixedly mounted on the horizontal frame bar portions and transverse frame bar portion of said front seat frame bar.

* * * * *